Sept. 13, 1960   F. J. RINDERER   2,952,588
DEVICE FOR CULTIVATING BACTERIA
Filed Aug. 21, 1957   3 Sheets-Sheet 2
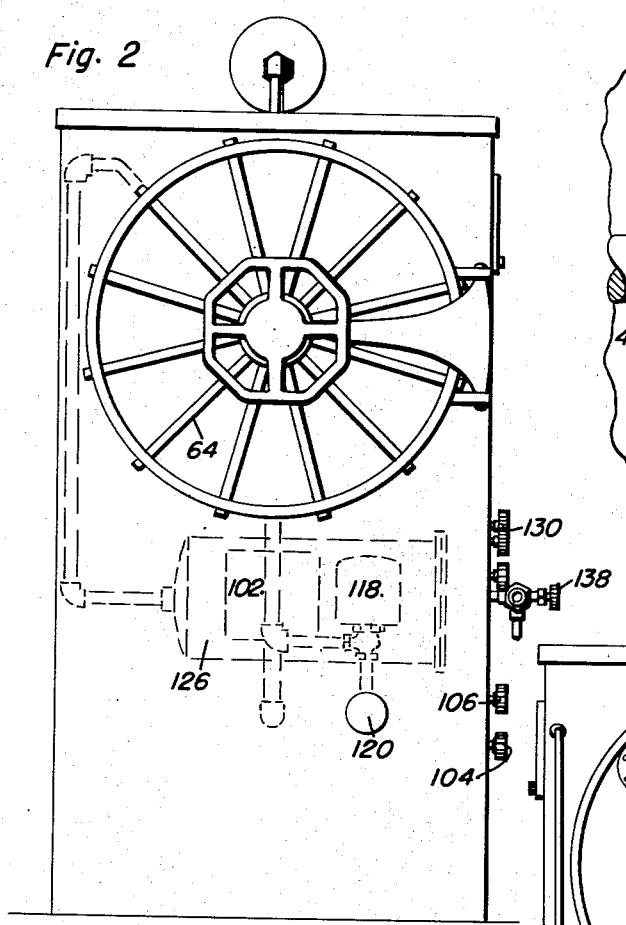
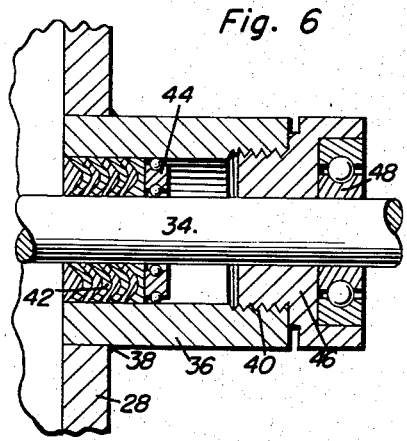
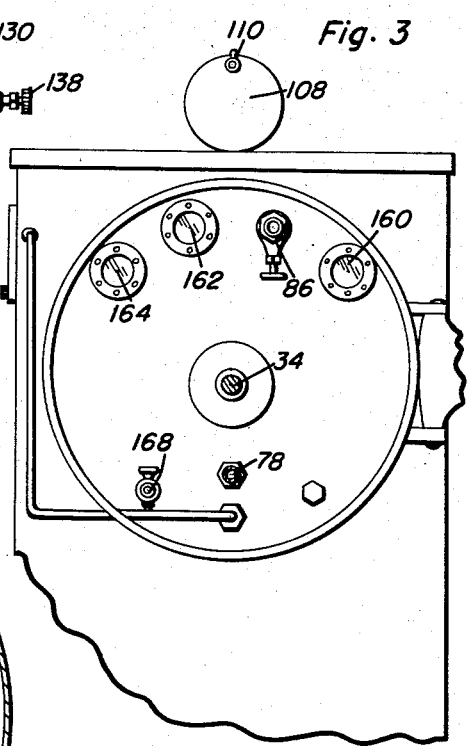
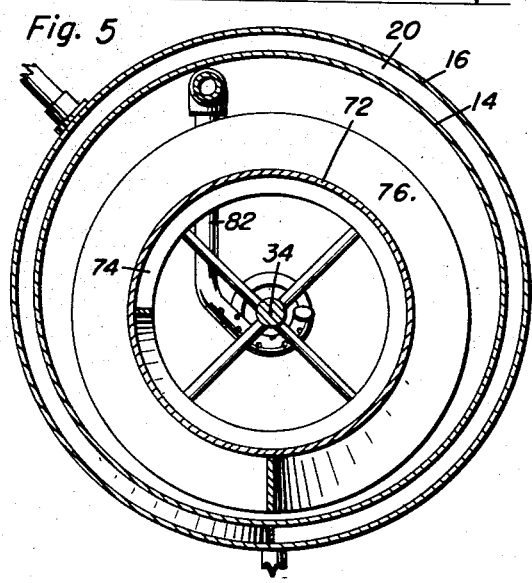
Francis J. Rinderer
INVENTOR.

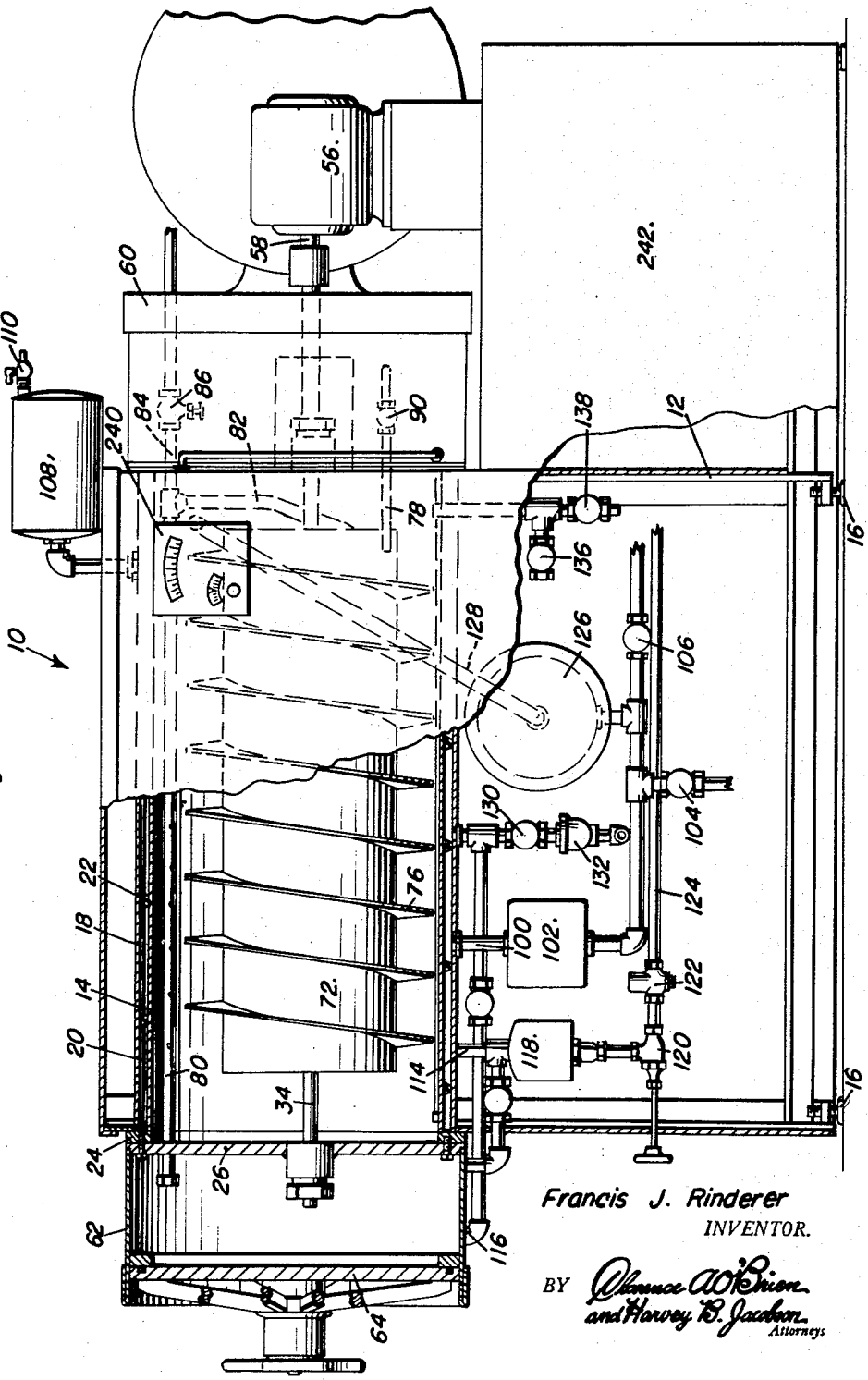

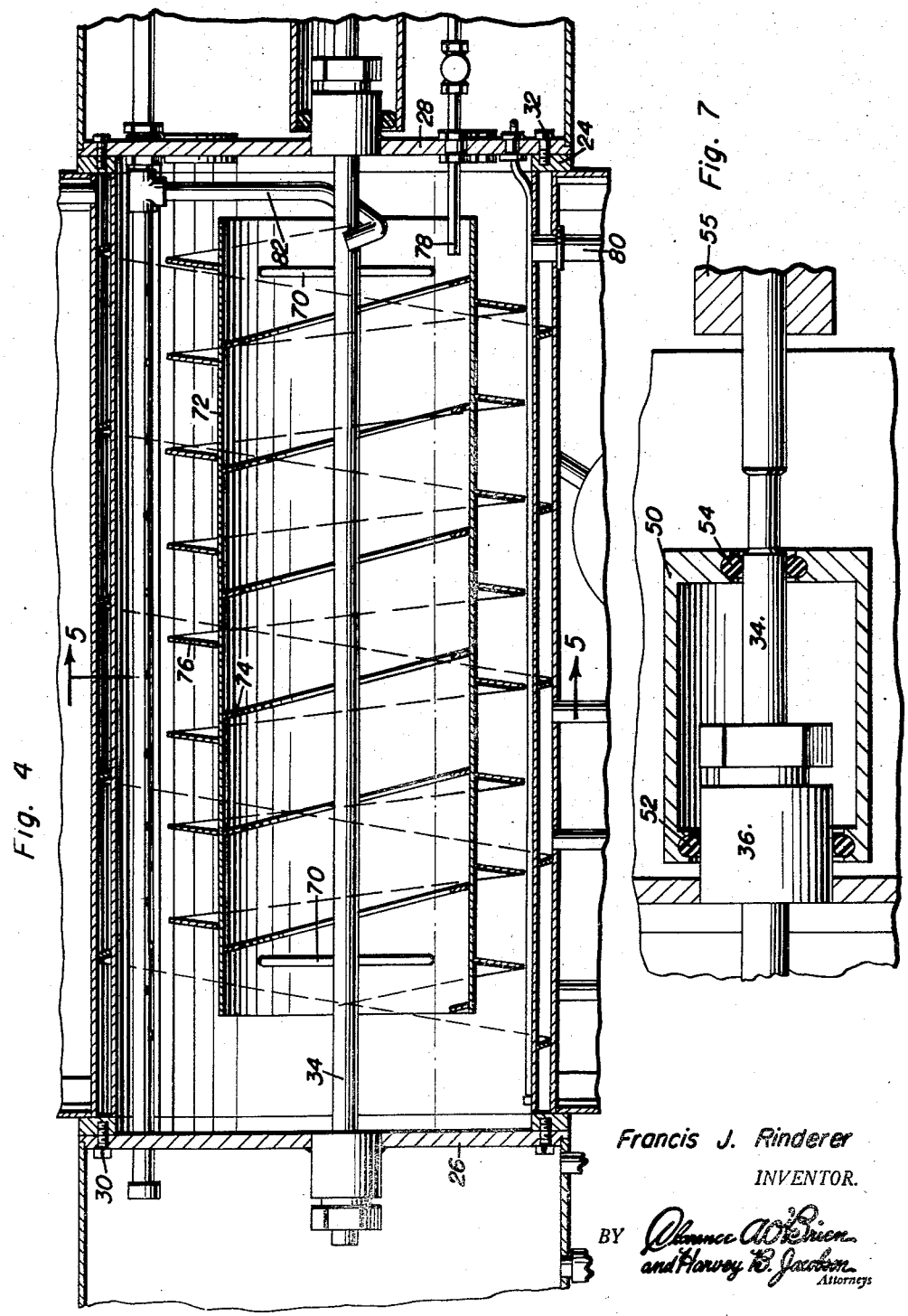

United States Patent Office 2,952,588
Patented Sept. 13, 1960

2,952,588

DEVICE FOR CULTIVATING BACTERIA

Francis J. Rinderer, Greenville, Ill., assignor to American Sterilizer Company, Erie, Pa., a corporation of Pennsylvania Filed Aug. 21, 1957, Ser. No. 679,368

3 Claims. (Cl. 195—143)

This invention relates to a device for cultivating bacteria and other microorganisms, such as yeasts, molds or the like and also for the purpose of preparing a continuous culture of a given bacteria product while being also adapted for batch production of bacteria.

The primary object of the present invention resides in the provision of a device for the continuous culture of bacteria which is also adapted to produce and synthesize various enzymes while being adapted for handling pathogenic bacteria.

When a culture of bacteria is placed in a nutrient medium there will be growth by division until some nutrient in the medium becomes limited and disappears by metabolism. If this limiting nutrient were added to the medium at a constant rate then the total amount of bacteria would increase in mass proportionally to the amount of fresh nutrient added. If at the same time that fresh nutrient is added an equal amount of culture is removed, then the bacteria will grow maintaining themselves in the state they were at the moment nutrient was added and the outgoing cultural bacteria would be obtained in an essentially fixed condition. The volume of the culture that is obtained would be equal to the amount of fresh nutrient added. Certain advantages are obtained in a continuous culture because the ordinary culture during its growth changes in properties because the concentration of the various nutrients in the medium change and because the culture produces toxic products or changes the acidity of the medium. Further, the ordinary culture may stop growth long before a given essential nutrient is used up because of the changes in the constituents of the medium due to toxic by-products or the like. In a continuous culture the organisms can be limited on a given nutrient which is rare and expensive and thereby assure the complete utilization of this factor. Further, the optimum conditions for the production of a given bacteria product can be easily chosen and this optimum condition may be maintained where in stationary cultures it is not possible to do so.

A further important object of the invention resides in the provision of means for mixing and aerating the culture which does not involve foaming, such as obtained by either using propeller systems or conventional auger arrangements. This is highly important because foaming destroys extra cellular proteins which might be of importance. Incorporated in the invention is the concept of providing an agitator comprising a shell having an internal and external helix in the form of a fin mounted thereon and so arranged as to drive the medium in one direction within the agitator and in the opposite direction from the outside of the agitator.

Still further objects and features of this invention reside in the provision of a device for cultivating bacteria which is so arranged as to enable the cleaning and sterilization of the machine at a rapid rate, which is effective in producing cultures of dangerous bacteria, since it is provided with effective safe-guards, and which device for cultivating bacteria is adapted to be used as a sterilizer for other devices and for other fluids.

These, together with the various ancillary objects and features of the invention which will become apparent as the following description proceeds, are attained by this device for cultivating bacteria, a preferred embodiment of which has been illustrated in the accompanying drawings by way of example only, wherein:

Figure 1 is a side elevational view of the device for cultivating material with portions thereof being broken away to show other portions in detail;

Figure 2 is a front end elevational view of the invention;

Figure 3 is a partial rear end elevational view of the device for cultivating bacteria;

Figure 4 is a longitudinal sectional detail view illustrating in particular the construction of the agitator and the drum together with the circulating chamber;

Figure 5 is a sectional detail view as taken along the plane of line 5—5 in Figure 4;

Figure 6 is an enlarged sectional detail view illustrating in particular the seal provided for the shaft; and Figure 7 is a further view illustrating the construction of the seal.

With continuing reference to the accompanying drawings wherein like reference numerals designate similar parts throughout the various views, reference numeral 10 is used to generally designate the device for cultivating bacteria comprising the present invention. The device is constructed of any suitable material but everything on the interior or exterior that comes in contact with the media is of low carbon stainless steel.

The device includes any suitable framework 12 on which a drum 14 of cylindrical shape is supported. The device may be provided with levelling means as at 16 for assuring that the device can be adjusted for support on any suitable laboratory floor or the like. The drum 14 includes not only the inner shell but an outer shell 18 forming a circulating jacket 20 therebetween. A helical baffle 22 is provided for directing the circulating fluid in a predetermined path. Welded or otherwise fixed to the drum are end flanges as at 24 to which end walls as at 26 and 28 are secured. Screws or other suitable fasteners 30 and 32 are used to hold the end walls 26 and 28 in place. Journalled in the end walls 26 and 28 is a shaft 34. The bearing mounting and seals for the shaft 34 can be best seen on inspection of Figures 6 and 7. The end wall 28 has a collar 36 welded as at 38 thereto which is internally threaded as at 40. Disposed within the collar 36 are suitable chevron packing seal 42 formed of any suitable material together with bearing 44. A plug 46 is threadedly disposed within the collar 36 and carries another bearing 48. The bearing 44 and the chevron packing seal 42 form a high vacuum seal for the shaft 34. Engaging the collar 36, see Figure 7, is a safety-seal housing 50 which carries Teflon seals 52 and 54 engageable with the shaft 34 and the collar 36. The shaft 34 is provided with a break-away coupling 55 to which the driveshaft of the motor 56 is connected, the driveshaft being indicated at 58. The motor is so arranged that it may be swung away from its position as is shown in Figure 1 so as to permit the end safety housing 60 which may actually be a form of sterilizing housing to be opened. To the other end wall 26 of the drum there is attached a sterilizer housing 62 similar to the sterilizer housing 60 which is provided with a door 64 which may be opened to permit access thereto. When the sterilizer housing door 64 is closed, the entire seal about the shaft may be sterilized to assure against penetration of any dangerous bacteria being cultivated in the device 10.

Mounted on the shaft 34 by means of spokes as at 70 is an agitator shell 72 of tubular shape having helical fins 74 and 76 secured to the interior and exterior surfaces respectively. These helical fins feed in opposite directions so that the path of media will be in the direction from the input tube or pipe 78 through the interior of the drum and then back through the exterior of the drum thence out through the media or culture output valve 138.

A manifold comprising a perforated pipe as indicated at 80 is disposed within the drum and has connected thereto suitable portions as at 82 and 84. There is provided a shut-out valve 86 controlling flow to the manifold 80. Air, oxygen, steam, water or other fluids may be connected for delivery to the interior of the drum through the manifold 80. The media input pipe 78 is provided with a valve 90.

A fluid inlet as at 100 is provided for the circulating jacket 20 and fluid or water is circulated in the jacket by means of a pump 102. A water waste valve 104 is connected to the pump as is water supply valve 106. An expansion jacket 108 for the tank is provided should air, gas, steam or the like be utilized in the tank and an air valve as at 110 is provided on the expansion jacket 108. In order to sterilize the tank, a steam line 114 is connected to the circulating jacket 20, and to the outer sterilizing shell 62 through the conduit as at 116. A steam control valve 118, a steam supply valve 120 and a conventional steam strainer 122 are provided, the conduit 124 leading from a suitable source of steam. A water heater 126 is mounted on the framework and connected to the fluid circulating inlet line by a conduit 128. The fluid outlet including a trap shut-off valve 130 and a trap 132 is provided for the jacket 20. The media outlet line is provided with a drain valve 136 and a media discharge valve 138 which may both be connected to a disinfectant jar as desired. As seen best in Figure 3, a sight glass 160 and illuminating lenses 162 and 164 are provided through which light may be directed for allowing inspection through the sight glass. A sample valve 168 is provided.

In operation, all valves are first closed and detergent is placed inside the chamber within the drum through any suitable conduit. Then, the vacuum valve through the chamber is opened and distilled water introduced and the motor and agitator is turned on with steam being applied to the jacket. The chamber is washed several minutes and then sterilized through the use of the steam in the jacket. The wash water is drained. Rinse water may be introduced for rinsing the interior and is drained out quickly after rinsing. This finishes the washing and sterilizing operation. A further sterilization is provided in the operation of the device. The sterilization is carried out at about 250° F. Media is placed in the chamber through the media inlet 78 through control of the valve 90. Then, steam is introduced into the jacket at 270° F. to provide good heat transfer so that the media will be sterilized at 250° F. After the sterilizing operation the steam is exhausted from the jacket and water is supplied to the jacket and thermostat controls set for the desired media temperature. A pressure, temperature, and thermostatic gauge as indicated at 240 is provided and other suitable controls may be mounted in the space 242 for the device. Of course, any suitable controls may be provided as desired. The air valve to the manifold may be opened as is necessary. The water heater 128 may be turned on as is the circulating pump 102 with the thermostat control set at a desired temperature. Then, the device is inoculated with the organism to be grown and media is fed in through the pipe 78 and discharged through the outlet as at 138. The action of the blades of the agitator serve not only to provide movement of the media but also to provide greater aeration as it clings to the blades which is a condition desirable for optimum growth.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for cultivating bacteria comprising a first cylindrical drum having a fluid media inlet connected thereto and a culture outlet connected thereto both arranged at the same ends of the said drum, said drum having end walls closing said drum, a shaft journalled in said end walls, drive means for rotating said shaft connected thereto, a second drum concentric with the first drum containing two series of helical fins acting as combined agitating and fluid transportation means, for two opposite directions, one of said series of helical agitating fluid transportation fins projecting from the second drum outwardly into the first drum operating in the direction towards the fluid media outlet, the other series of helical agitating fluid transportation fins projecting inwardly into the interior of the said second drum, moving the fluid media away from the fluid media inlet and spokes secured to said shaft and said second drum for mounting said second drum on the said shaft.

2. A device for cultivating bacteria as claimed in claim 1 comprising in addition, a circulatory fluid jacket about said first drum, and means for circulating fluid in said jacket connected thereto and including a circulating pump for delivering fluid to said jacket, said jacket having a helical baffle therein for directing the flow of circulating fluid in said jacket.

3. A device for cultivating bacteria comprising a first stationary cylindrical drum having a fluid media inlet and a fluid media outlet on the same side of the said drum, both arranged near the same end of the drum, said drum having end walls closing the same, a shaft journaled in said end walls, drive means for rotating said shaft connected thereto, a second drum concentric with the said first drum, spokes secured to the shaft and said second drum mounting said second drum on said shaft, the fluid media inlet being located at one end of the said second drum, two sets of helical fin means operating in two directions projecting from the said second drum on the external and internal surfaces thereof, respectively, one of the said sets operating in the interior of the said second drum moving the fluid media within the interior of the second drum away from the inlet and the other set of helical fins operating within the first stationary drum moving the fluid media towards the outlet, and sterilizing chambers secured to said drum enclosing said end walls.

References Cited in the file of this patent

UNITED STATES PATENTS

| | | |
|---|---|---|
| 2,390,388 | Rector | Dec. 4, 1945 |
| 2,686,754 | Monod | Aug. 17, 1954 |
| 2,713,702 | Jewell | July 26, 1955 |

FOREIGN PATENTS

| | | |
|---|---|---|
| 230,543 | Germany | Feb. 1, 1911 |